(12) United States Patent
Kawade (10) Patent No.: US 7,304,664 B2
(45) Date of Patent: Dec. 4, 2007

(54) DIGITAL CAMERA HAVING A DISPLAY UNIT TO DISPLAY THE PRINT STATUS OF A CONNECTED PRINTER

(75) Inventor: Takahisa Kawade, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 571 days.

(21) Appl. No.: 09/951,457

(22) Filed: Sep. 14, 2001

(65) Prior Publication Data

US 2002/0036695 A1    Mar. 28, 2002

(30) Foreign Application Priority Data

Sep. 20, 2000    (JP) .............................. 2000/285301

(51) Int. Cl.
*H04N 5/225*    (2006.01)

(52) U.S. Cl. .............................. 348/207.2; 348/333.01; 348/333.02; 348/333.04; 348/333.05; 348/333.12; 348/552; 348/563; 348/564

(58) Field of Classification Search ..............................
348/333.01–333.13, 207.2, 207.1, 552, 1.1, 348/207.99, 564, 563; 358/1.1
See application file for complete search history.

(56) References Cited

U.S. PATENT DOCUMENTS 4,827,347 A * 5/1989 Bell ....................... 348/333.05
5,710,954 A * 1/1998 Inoue ......................... 396/374
5,847,836 A * 12/1998 Suzuki ....................... 358/296
6,075,949 A * 6/2000 Hatakenaka et al. ........ 396/301
6,317,141 B1 * 11/2001 Pavley et al. ............... 715/732
6,552,743 B1 * 4/2003 Rissman ................... 348/207.2
6,724,502 B1 * 4/2004 Miyake et al. .............. 358/474
6,771,896 B2 * 8/2004 Tamura et al. ................ 396/57
6,795,114 B1 * 9/2004 Johnson et al. .......... 348/207.2
6,886,056 B2 * 4/2005 Ohmura ....................... 710/62

FOREIGN PATENT DOCUMENTS

JP            08-106370      *   4/1996
JP            11-052479      *   2/1999
JP          11-52479 A       *   2/1999

OTHER PUBLICATIONS

English translation of JP 11-052479.

* cited by examiner

*Primary Examiner*—Lin Ye
*Assistant Examiner*—Chriss S Yoder, III
(74) *Attorney, Agent, or Firm*—Fitzpatrick, Cell, Harper & Scinto

(57) ABSTRACT

A digital camera and a printer are directly connected to each other, and a printing progress situation is displayed on a display unit of the digital camera while an image taken by the digital camera is being printed. Further, when a printing mode is changed to a photographing mode while the printing is being performed, the image being taken is displayed on the entire display unit, and the printing progress situation is superposed and displayed on a predetermined area of the display unit on which the image being taken is displayed.

8 Claims, 8 Drawing Sheets

DIGITAL CAMERA HAVING A DISPLAY UNIT TO DISPLAY THE PRINT STATUS OF A CONNECTED PRINTER

BACKGROUND OF THE INVENTION

1. Field of the Invention

The present invention relates to a digital camera, and more particularly to a display control technique for a display unit of the digital camera.

2. Related Background Art

In recent years, a direct printing method of directly connecting a digital camera to a printer by using a cable and causing the printer to print out an image taken by the digital camera has begun to spread.

In such a conventional direct printing method, an image display unit of the digital camera can not be used while the image is being printed out.

For this reason, in the conventional direct printing method, if a user selects a printing mode and starts printing, he can not grasp or see a printing situation, e.g., which image is being printed, how the printing is progressing, or the like, thus causing inconvenience.

Further, while the printing is being performed, it is impossible to concurrently perform a photographing operation by causing the display unit to act as an electronic finder, and it is also impossible to concurrently perform a reproduction operation by causing the display unit to reproduce a taken image, thus causing more inconvenience.

SUMMARY OF THE INVENTION

An object of the present invention is to provide a digital camera and its control method which eliminate such drawbacks as above.

Another object of the present invention is to provide a digital camera and its control method which can effectively use a display unit of the digital camera in a case where an image taken by the digital camera is being printed in a direct printing method.

Still another object of the present invention is to provide a digital camera and its control method which cause a display unit to display at least a printing progress situation of a printer.

Other objects and features of the present invention will become apparent from the following description and the attached drawings.

DETAILED DESCRIPTION OF THE PREFERRED EMBODIMENTS

Hereinafter, the preferred embodiments of the present invention will be described in detail with reference to the accompanying drawings.

Figure 1:
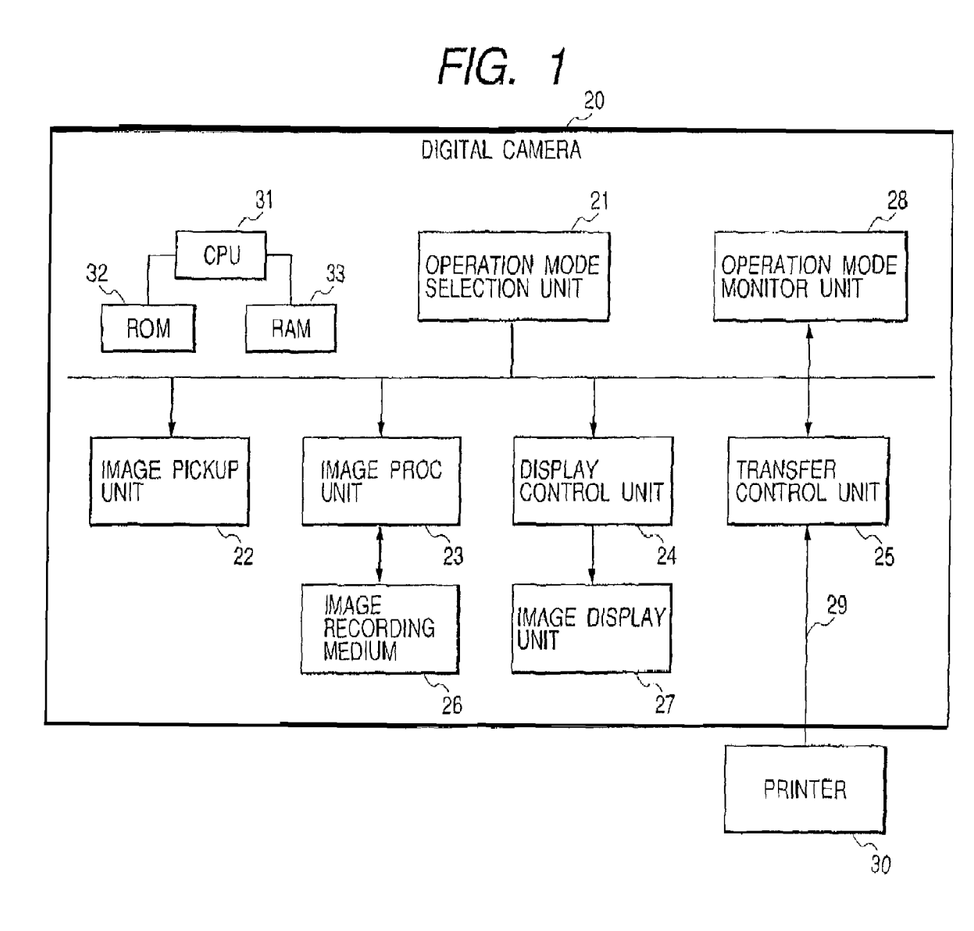
FIG. 1 is a block diagram showing a schematic structure of a digital camera to which the present invention is applied.

FIG. 1 is a block diagram showing a schematic structure of a digital camera 20 to which the present invention is applied. In FIG. 1, numeral 21 denotes an operation mode selection unit which can select, as an operation mode, a photographing mode to perform photographing and take an image, a reproduction mode to reproduce a taken image, a printing mode to perform image printing, and the like. It should be noted that, since the operation mode selection unit 21 is not especially limited, a mode dial, a mode determination switch, or the like, capable of selecting the operation mode may be used as the operation mode selection unit 21.

Numeral 22 denotes an image pickup unit which has a lens, a CCD (charge-coupled device), a diaphragm, and the like. Numeral 23 denotes an image processing unit which develops, compresses, decompresses and rotates the taken image, and creates thumbnail images. Numeral 24 denotes a display control unit which controls an image display operation of an image display unit 27. The display control unit 24 controls the image display operation to display an image according to the operation mode selected by the operation mode selection unit 21.

Numeral 25 denotes a transfer control unit which transfers image data being the printing target to the printer 30 when the digital camera 20 and a printer 30 are directly connected to each other by a cable 29 and thus the image taken by the digital camera 20 is directly printed by the printer 30. Numeral 26 denotes an image recording medium on which the image data taken by the image pickup unit 22 and subjected to the image process by the image processing unit 23 is always or temporarily stored. The image recording medium 26 is not limited to a type built in the digital camera 20 but may be a type detachably mounted to the digital camera 20.

The image display unit 27 which is composed of a liquid crystal display and the like is used as an electronic finder or the like. As described later, an image representing a printing progress situation (called a printing progress situation image hereinafter) of the printer 30, a reproduction of the image recorded on the image recording medium 26, and the like are displayed on the image display unit 27. Numeral 28 denotes an operation mode monitor unit which monitors start/stop of the operation mode.

It should be noted that the operations of the above components of the digital camera 20 are controlled by a CPU (central processing unit) 31 on the basis of programs preset in a ROM (read-only memory) 32. At this time, the CPU 31 uses a RAM (random-access memory) 33, or the like, as a working area.

Figure 2:
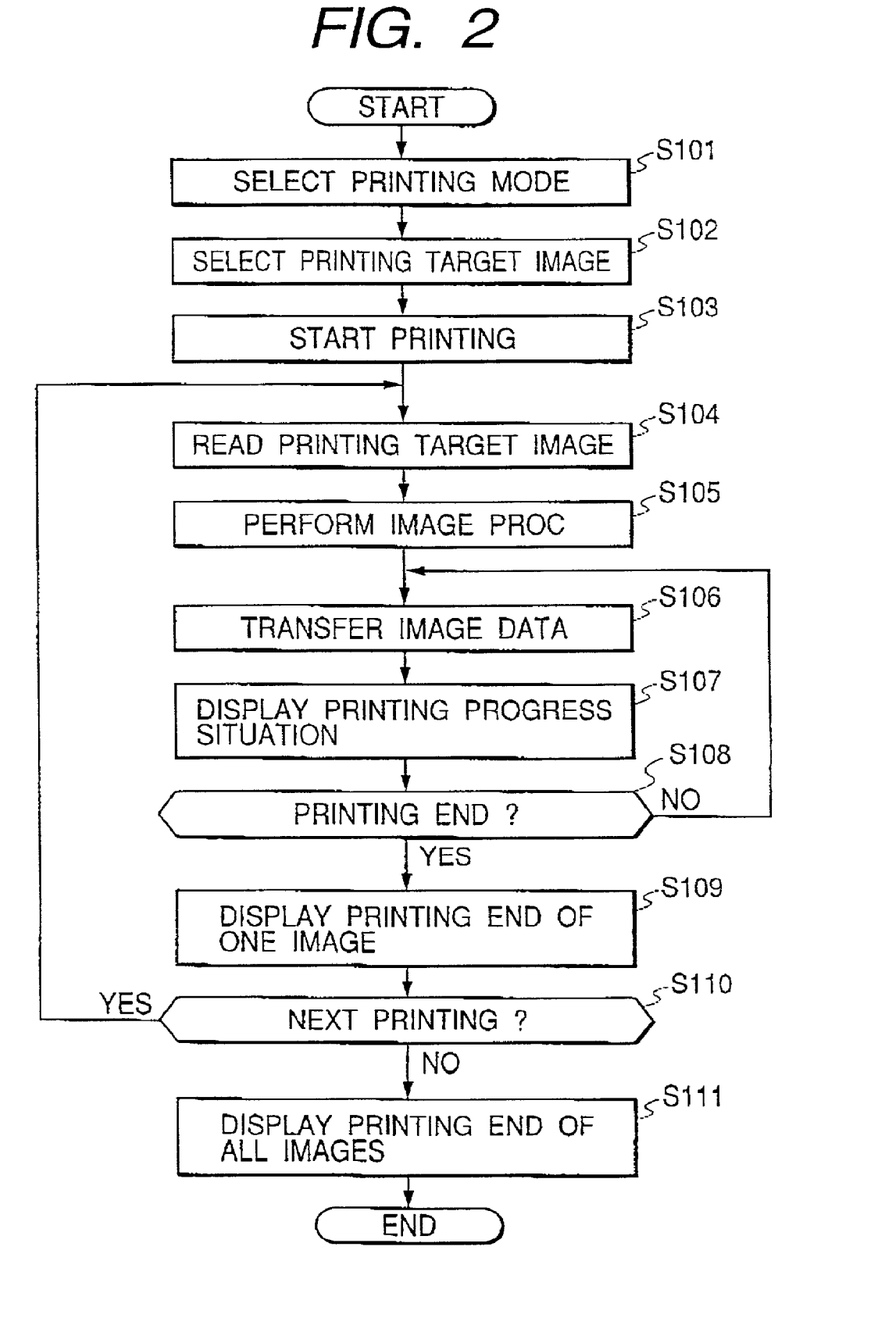
FIG. 2 is a flow chart showing a process in a printing mode.

Next, a process in the printing mode will be explained with reference to a flow chart shown in FIG. 2.

If the printing mode is selected by the operation mode selection unit 21 such as the mode dial or the like (step S101), the CPU 31 first causes the image display unit 27 to display a selection screen on which images being the printing targets (called printing target images) are displayed together with their respective photographing image file names, whereby a user selects the printing target image on the selection screen 27 (step S102). How to select the printing target screen is not limited to the above, but is arbitrary. That is, the user can select the plural printing target images at a time.

After the printing target image was selected, a printing start is instructed by user's key operations (step S103). The CPU 31 reads image data of the selected printing target image from the image recording medium 26 and transfers the read image data to the RAM 33 (step S104). The image data is converted by the image processing unit 23 to have a data format suitable for the printer 30 (step S105). At this time, the image processing unit 23 keeps storing the image data read from the image recording medium 26 in the RAM 33 and also stores the image data subjected to the data format conversion in another area of the RAM 33. Here, the image data subjected to the data format conversion may be sequentially transferred to the transfer control unit 25.

Next, the CPU 31 transfers the image data subjected to the data format conversion to the printer 30 (step S106). Then, the CPU 31 causes the image display unit 27 to display the printing progress situation image of the printer 30 (step S107). It should be noted that the display of the printing progress situation will be explained later in detail.

Next, it is judged by the CPU 31 whether or not printing of one image has reached its end (step S108). If judged that the printing does not end, the flow returns to the step S106 to continue the transfer of the image data and the display of the printing progress situation image. Conversely, if judged in the step S108 that the printing of the one image has reached its end, such a fact is displayed on the image display unit 27 (step S109). For example, a message "printing of first image ends" or a message "printing of XX image ends" is displayed on the image display unit 27.

Next, it is judged whether or not a next image selected as the printing target (called a next printing target image) exists (step S110). If judged that the next printing target image exists, the flow returns to the step S104 to read image data of the next printing target image and transfer the read image data to the RAM 33. Conversely, if judged in the step S110 that the next printing target image does not exist, a fact that the printing of all the images selected as the printing targets ends is displayed on the image display unit 27 (step S111). For example, a message "all printing ends" is displayed. After then, the process ends.

Next, control for display of the printing progress situation image will be explained with reference to FIGS. 3 to 5.

Figure 3:
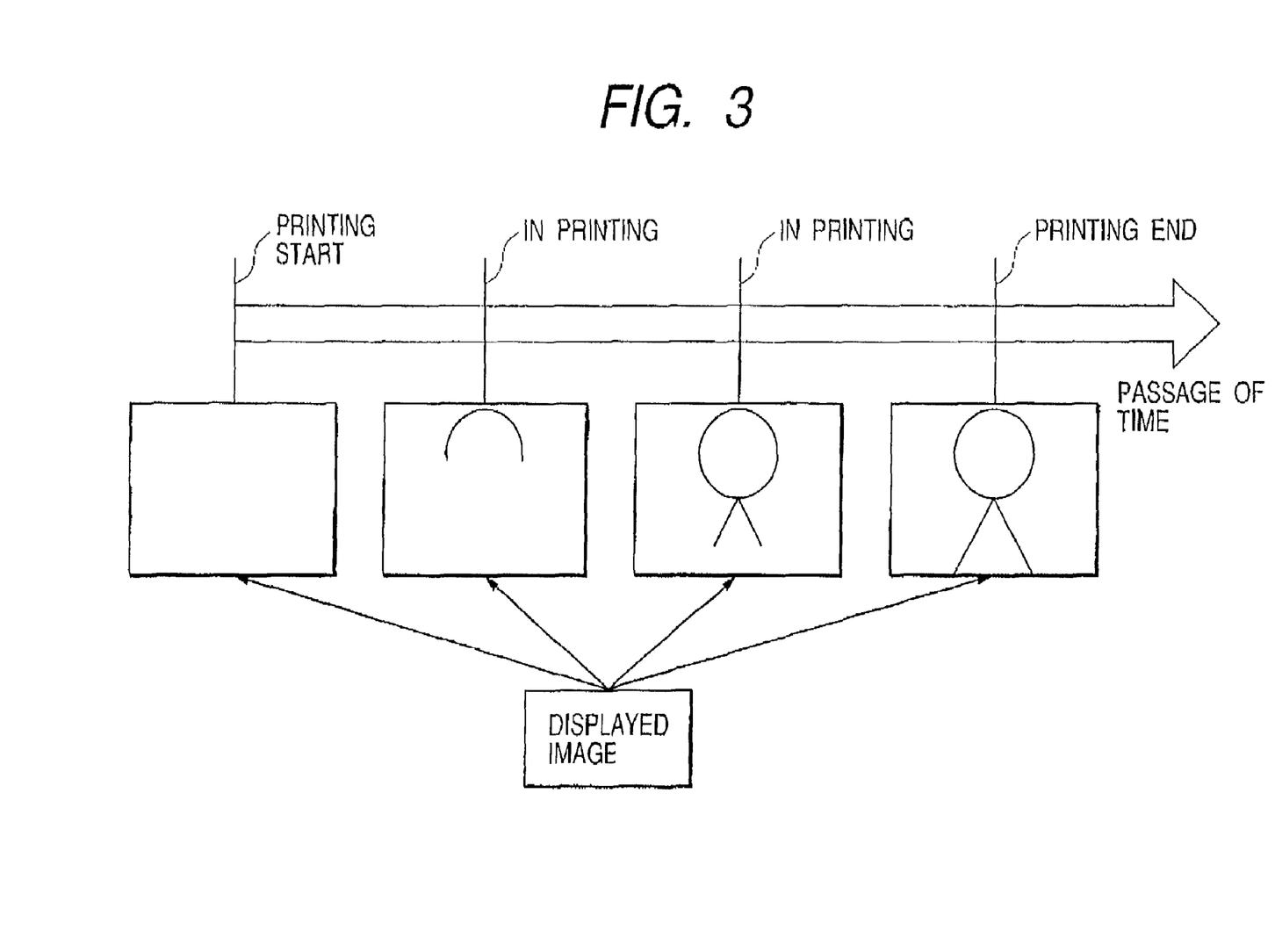
FIG. 3 is a diagram for explaining a first image example showing a printing progress situation.

In an example of FIG. 3, the printing target image data transferred from the transfer control unit 25 to the printer 30 are displayed sequentially from the head. In this case, the CPU 31 monitors the data transfer situation by the transfer control unit 25, and based on such the monitoring the display control unit 24 causes the image display unit 27 to sequentially display the image data before the data format conversion within the RAM 33 respectively corresponding to the data already subjected to the data transfer.

Figure 4:
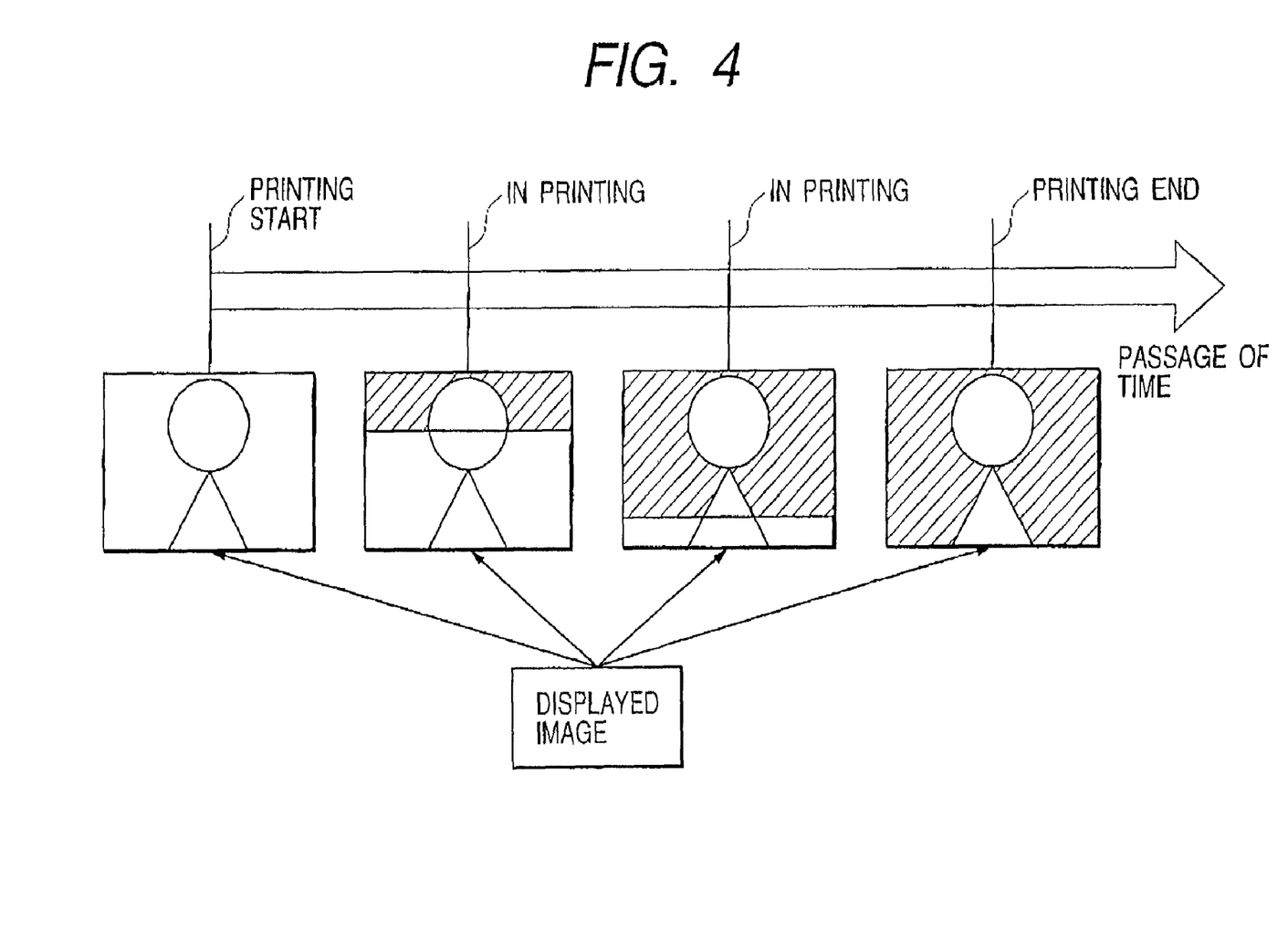
FIG. 4 is a diagram for explaining a second image example showing the printing progress situation.

In an example of FIG. 4, the CPU 31 causes the image display unit 27 to display, with low chroma, all the image data before the data format conversion at the same time as the printing start. Then, the CPU 31 monitors the data transfer situation by the transfer control unit 25, and thus sequentially changes the chroma of the image data before the data format conversion corresponding to the data already subjected to the data transfer into ordinary chroma. Namely, the printing progress situation is displayed in the method same as a Progressive JPEG (Joint Photographic Expert Group) method.

Figure 5:
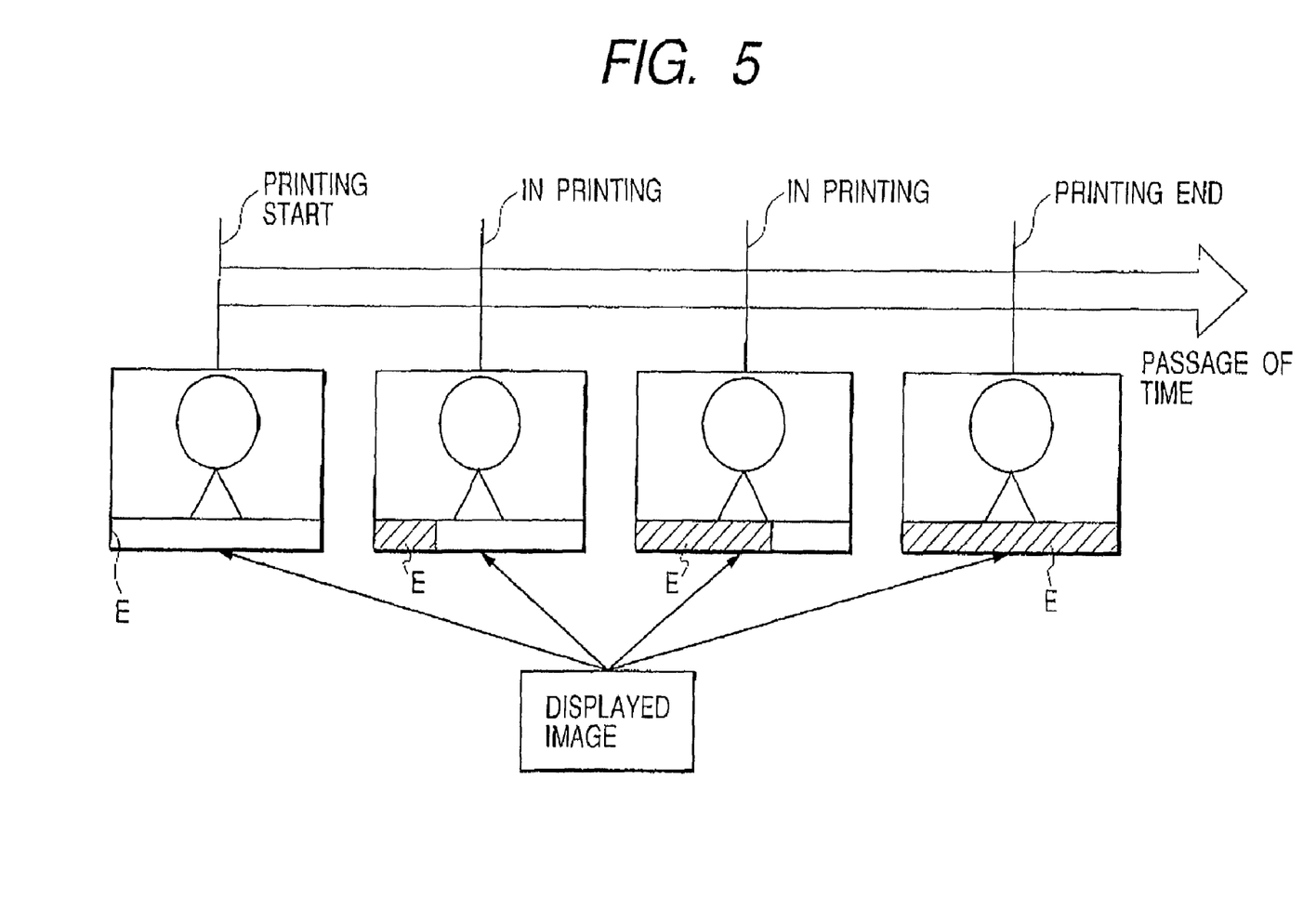
FIG. 5 is a diagram for explaining a third image example showing a printing progress situation.

In an example of FIG. 5, a bar graph display area E is provided on the image display unit 27 such that the area E overlaps the printing target image. Thus, a bar graph in the bar graph display area E is elongated according to a data transfer quantity of the transfer control unit 25.

It should be noted that the printing progress situation may not be represented by the bar graph. Namely, a ratio of the image to which the printing ended may be displayed by character information such as "15%". Further, such the character information may be displayed together with the bar graph. On the other hand, a ratio of the image to which the printing does not end may be displayed by character information such as "the remainder is 15%". Also, a time necessary to end the printing may be displayed, e.g., "the remainder is 3 minutes and 30 seconds". Further, the printing target image may not be displayed, and instead a file name may be displayed as character information.

As described above, since the printing progress situation image is displayed when the printing mode is selected, the user can surely see and grasp which image is being printed (in the cases of FIGS. 3 and 4), how the printing ended (in the cases of FIGS. 3 to 5), and the like. Thus, the user can easily determine what to do next with the digital camera, whereby the convenience of the digital camera improves.

Figure 6:
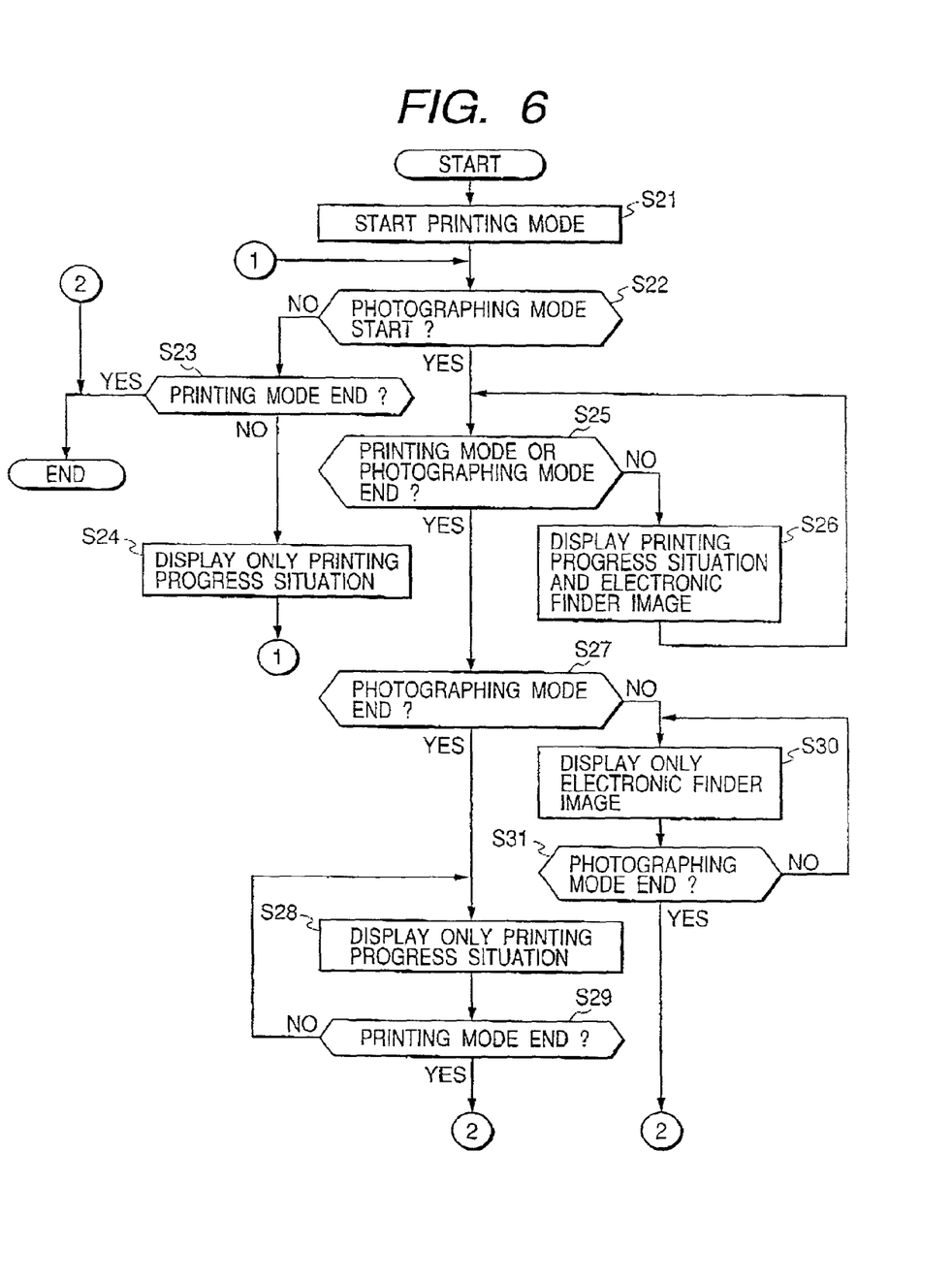
FIG. 6 is a flow chart showing image display control in a case where the printing mode and a photographing mode are competitive.

Next, a display process in a case where the printing mode and the photographing mode are competitive will be explained with reference to FIG. 6.

When a printing operation in the printing mode is started (step S21), it is judged by the CPU 31 whether or not the photographing mode is started (step S22). If judged that the photographing mode is not started, then it is judged whether or not the printing mode ends (step S23). If judged that the printing mode ends, the process ends. Conversely, if judged that the printing mode does not end, only the printing progress situation image is displayed on the image display unit 27 (step S24) (see images G1 and G2 in FIG. 7), and the flow returns to the step S21.

On the other hand, if judged in step S22 that the photographing mode is started, then it is judged whether or not the photographing mode or the printing mode ends (step S25). If judged that the photographing mode or the printing mode does not end, an electronic finder image (i.e., a through image during photographing by an image pickup element) and the printing progress situation image are concurrently or simultaneously displayed on the image display unit 27 (step S26) (see images G3 and G4 in FIG. 7), and the flow returns to the step S25.

On the other hand, if judged in the step S25 that the photographing mode or the printing mode ends, then it is judged which of the photographing mode and the printing mode ends (step S27). If judged that the photographing mode ends, only the printing progress situation image is displayed on the image display unit 27 (step S28) (see the images G1 and G2 in FIG. 7), and then it is judged whether or not the printing mode ends (step S29). If judged that the printing mode does not end, the flow returns to the step S28 to continue the display of only the printing progress situation image, while if judged that the printing mode ends, the process ends.

On the other hand, if judged in the step S27 that the printing mode ends, only the electronic finder image is displayed on the image display unit 27 (step S30) (see an image G5 in FIG. 7), and then it is judged whether or not the photographing mode ends (step S31). If judged that the photographing mode does not end, the flow returns to the step S30 to continue the display of only the electronic finder image, while if judged that the photographing mode ends, the process ends.

Figure 7:
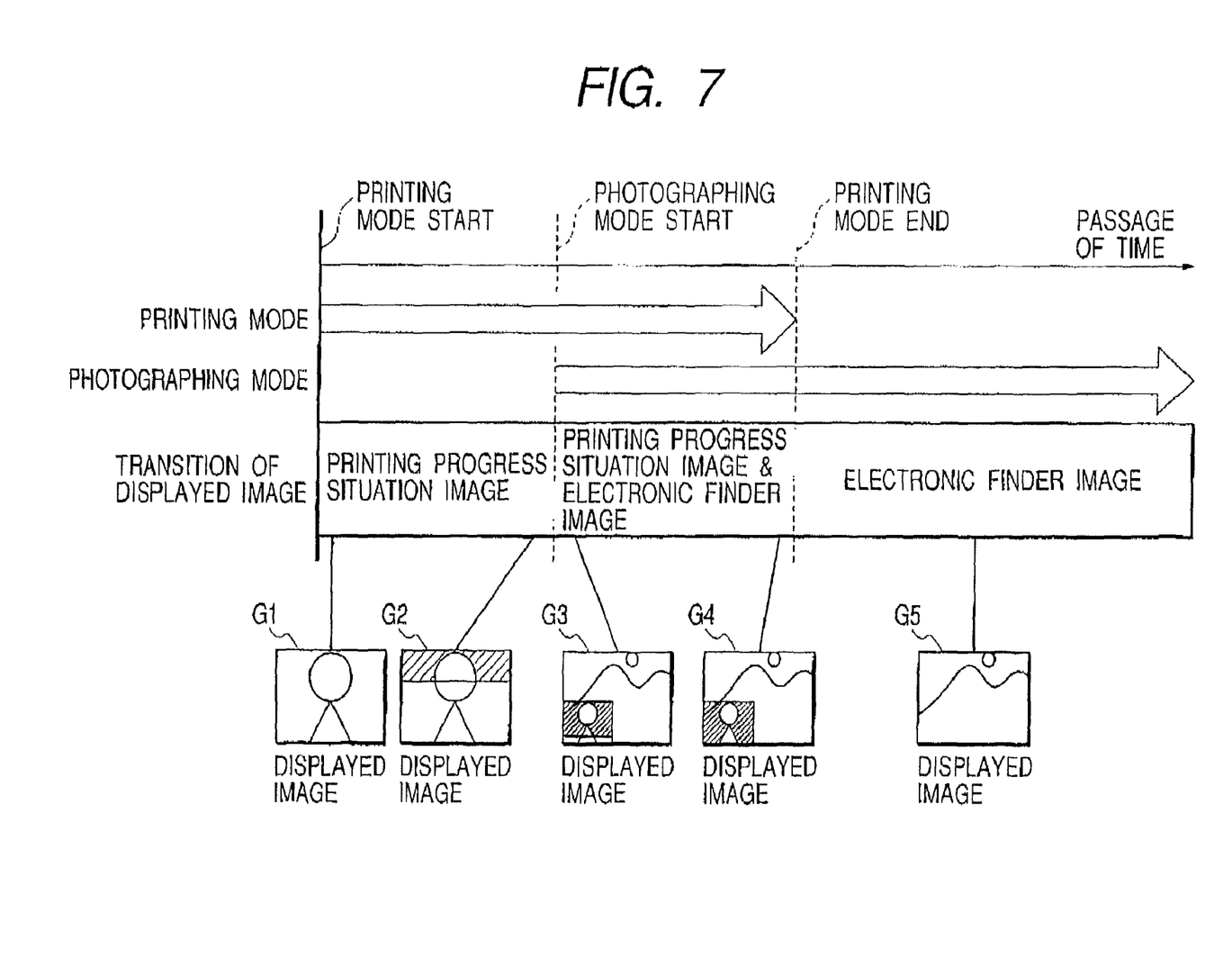
FIG. 7 is a diagram showing an image display example in the case where the printing mode and the photographing mode are competitive.

In the example of FIG. 7, when the printing progress situation image or the electronic finder image is solely displayed, such the sole image is displayed enlargedly on the entire display screen of the image display unit 27. On the other hand, when both the printing progress situation image and the electronic finder image are concurrently displayed on the image display unit 27, the printing progress situation image is superposed on the predetermined area of the electronic finder image, whereby the display screen of the limited area on the image display unit 27 is effectively used.

Besides, when both the printing progress situation image and the electronic finder image are concurrently displayed, the printing progress situation image is displayed in the manner shown in FIG. 4. Namely, the printing progress situation is displayed small, such as a thumbnail image, in Progressive JPEG method, while the electronic finder image is displayed enlargedly on the entire display screen of the image display unit 27. The reason why the electronic finder image is displayed enlargedly is to enable the user to smoothly perform the photographing operation.

However, the present invention is not limited to such display method. For example, the printing progress situation image may be displayed gradually from its part to which the printing has ended as shown in FIG. 3, or may be displayed with the bar graph as shown in FIG. 5. Also, when the image is displayed gradually from its part to which the printing has ended as shown in FIG. 3, it is preferable to display such image as a thumbnail image.

Further, when both the printing progress situation image and the electronic finder image are concurrently displayed, it is possible not to superpose these images but separately display them respectively in mutually different display areas on the image display unit 27. In this case, it is desirable to enable the user to smoothly perform the photographing operation by widening the display area of the electronic finder image more than the display area of the image of the printing progress situation.

Thus, by concurrently displaying both the printing progress situation image and the electronic finder image, the user can save time. Further, he can smoothly perform the photographing operation, and the like, while confirming the printing progress situation and the image intended to be photographed.

Figure 8:
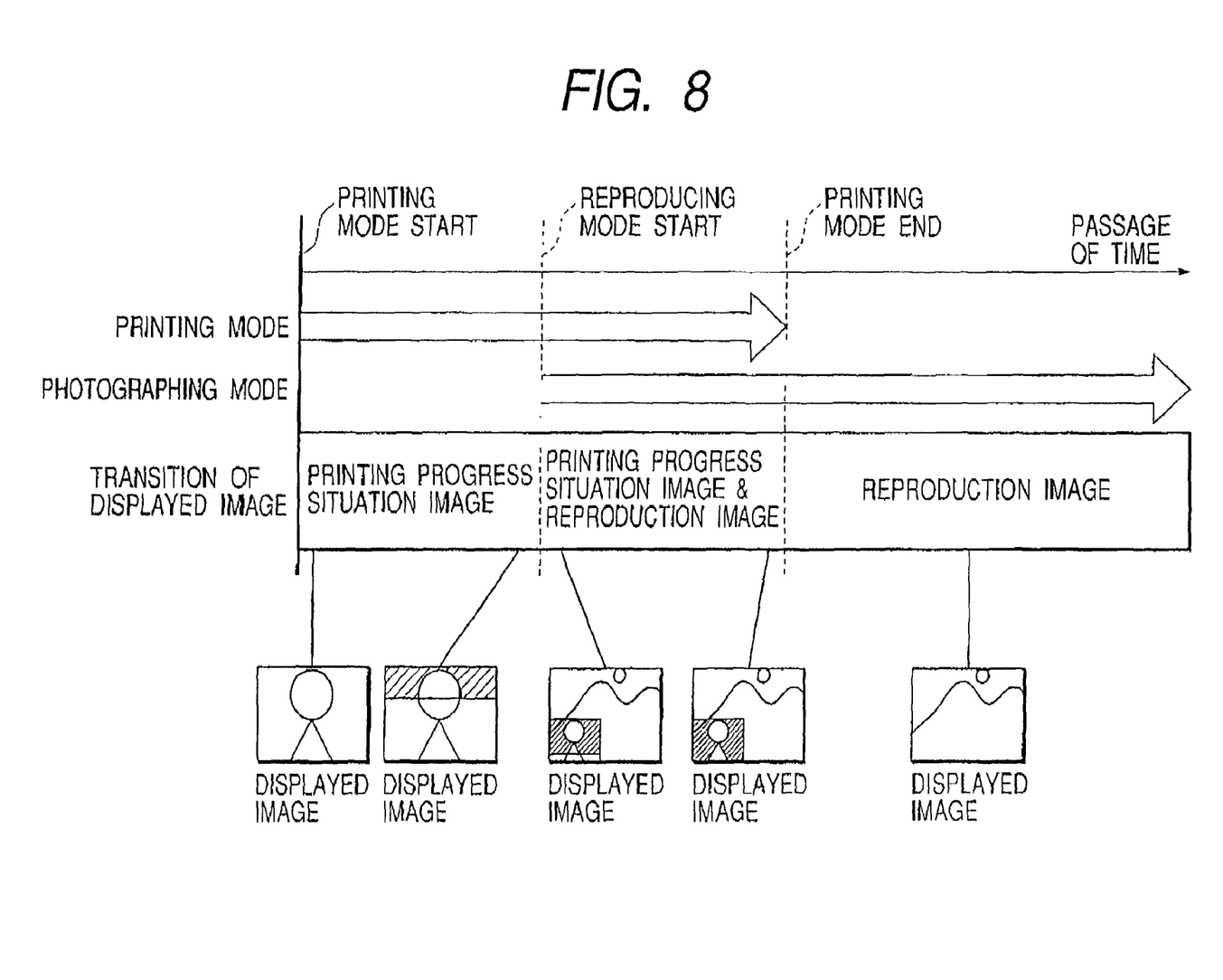
FIG. 8 is a diagram showing an image display example in a case where the printing mode and a reproduction mode are competitive.

Further, as shown in FIG. 8, in a case where the image is reproduced, instead of the electronic finder image, a reproduced image can be displayed together with the printing progress situation image on the image display unit 27. In this case, the image display control only has to be performed according to the procedure same as the procedure shown in FIG. 6.

Further, the present invention is applicable not only to the case where the printing mode and the photographing mode or the reproduction mode are competitive but also to a case where the printing mode and other operation modes are competitive.

Further, the present invention is applicable to a digital camera in which a digital camera unit and a printer unit are unitarily composed.

As explained above, in the digital camera which includes the display unit for displaying the taken or photographed image and has the function to print the taken or photographed image with the directly connected printer, the display control unit for causing the display unit to display at least the printing progress situation of the printer is provided, whereby the display unit of the digital camera can be effectively used while the image taken or photographed by the digital camera is being printed in a direct printing method.

As many apparently and widely different embodiments can be made without departing from the spirit and scope of the present invention, it is to be understood that the present invention is not limited to the above embodiment except as defined in the appended claims.

What is claimed is:

1. A digital camera comprising:
a photographing unit that takes an image in a photographing mode;
a display unit that displays the taken image;
an output unit that outputs the taken image to a printer unit in a printing mode; and
a control unit that controls to display a printing progress situation of the printer unit on said display unit in the printing mode,
wherein, when said control unit controls to display the printing progress situation of the printer unit on said display unit in the printing mode, said control unit controls, in response to an instruction by a user to shift an operation mode to the photographing mode, to display the taken image supplied from said photographing unit and information indicating the printing progress situation in the photographing mode so that the information indicating the printing progress situation and the taken image taken in the photographing mode are displayed together in such a manner that the taken image is displayed in a larger size and the information indicating the printing progress situation is displayed in a smaller size, and when a printing operation of the printer unit ends, said control unit controls to maintain the photographing mode shifted from the printing mode, and then stop displaying the information indicating the printing progress situation so that the image taken in the maintained photographing mode is displayed.

2. A digital camera according to claim 1, wherein the digital camera is connected to the printer unit by a cable.

3. A digital camera comprising:
a photographing unit that takes an image in a photographing mode;
a storage unit that stores the taken image;
a display unit that displays the taken image, wherein, in a reproduction mode, the taken image stored in said storage unit is read and displayed on said display unit;
an output unit that outputs the taken image to a printer unit in a printing mode; and
a control unit that controls to display a printing progress situation of the printer unit on said display unit in the printing mode,
wherein, when said control unit controls to display the printing progress situation of the printer unit on said display unit in the printing mode, said control unit controls, in response to an instruction by a user to shift an operation mode to the reproduction mode, to display on said display unit the taken image read from said storage unit and information indicating the printing progress situation in the reproduction mode so that the information indicating the printing progress situation and the taken image read out from said storage unit in the reproduction mode are displayed together in such a manner that the taken image is displayed in a larger size and the information indicating the printing progress situation is displayed in a smaller size, and when a printing operation of the printer unit ends, said control unit controls to maintain the reproduction mode shifted from the printing mode, and then stop displaying the information indicating the printing progress situation so that the taken image read out from said storage unit in the maintained reproduction mode is displayed.

4. A digital camera according to claim 3, wherein the digital camera is connected to the printer unit by a cable.

5. A control method for a digital camera, comprising:

a photographing step of taking an image in a photographing mode by a photographing unit;

a display step of displaying the taken image on a display unit of the digital camera;

an output step of outputting the taken image to a printer unit in a printing mode; and a control step of controlling to display a printing progress situation of the printer unit on the display unit in the printing mode, wherein, when said control unit controls to display the printing progress situation of the printer unit on the display unit in the printing mode, said control step is adapted to control, in response to an instruction by a user to shift an operation mode to the photographing mode, to display the taken image supplied from the photographing unit and information indicating the printing progress situation in the photographing mode so that the information indicating the printing progress situation and the taken image taken in the photographing mode are displayed together in such a manner that the taken image is displayed in a larger size and the information indicating the printing progress situation is displayed in a smaller size, and when a printing operation of the printer unit ends, said control step is adapted to control to maintain the photographing mode shifted from the printing mode, and then stop displaying the information indicating the printing progress situation so that the image taken in the maintained reproduction mode is displayed.

6. A control method according to claim 5, wherein the digital camera is connected to the printer unit by a cable.

7. A control method for a digital camera, comprising:

a photographing step of taking an image in a photographing mode;

a storage step of storing the taken image in a storage unit;

a display step of displaying the taken image on a display unit of the digital camera, wherein, in a reproduction mode, the taken image stored in the storage unit is read and displayed on the display unit;

an output step of outputting the taken image to a printer unit in a printing mode; and a control step of controlling to display a printing progress situation of the printer unit on the display unit in the printing mode, wherein, when said control step controls to display the printing progress situation of the printer unit on the display unit in the printing mode, said control step is adapted to control, in response to an instruction by a user to shift an operation mode to the reproduction mode, to display on the display unit the taken image read from the storage unit and information indicating the printing progress situation in the reproduction mode so that the information indicating the printing progress situation and the taken image read out from the storage unit in the reproduction mode are displayed together in such a manner that the taken image is displayed in a larger size and the information indicating the printing progress situation is displayed in a smaller size, and when a printing operation of the printer unit ends, said control step is adapted to control to maintain the reproduction mode shifted from the printing mode, and then stop displaying the information indicating the printing progress situation so that the taken image read out from the storage unit in the maintained reproduction mode is displayed.

8. A control method according to claim 7, wherein the digital camera is connected to the printer unit by a cable.

* * * * *

UNITED STATES PATENT AND TRADEMARK OFFICE
CERTIFICATE OF CORRECTION

PATENT NO.      : 7,304,664 B2
APPLICATION NO. : 09/951457
DATED           : December 4, 2007
INVENTOR(S)     : Takahisa Kawade It is certified that error appears in the above-identified patent and that said Letters Patent is hereby corrected as shown below:

COLUMN 1:
Line 17, "can not" should read --cannot--.
Line 21, "can not" should read --cannot--.

COLUMN 5:
Line 22, "procedure same" should read --same procedure--.

Signed and Sealed this

Sixteenth Day of December, 2008

JON W. DUDAS
*Director of the United States Patent and Trademark Office*